No. 640,332. Patented Jan. 2, 1900.
J. L. & E. A. DE STEIGER.
JAR CLOSURE.
(Application filed Apr. 29, 1899.)

(No Model.)

Witnesses:

Inventors
Joseph L. DeSteiger &
Edward A. DeSteiger
By James Sheehy
Attorney

THE NORRIS PETERS CO., PHOTO-LITHO., WASHINGTON, D. C.

UNITED STATES PATENT OFFICE.

JOSEPH L. DE STEIGER AND EDWARD A. DE STEIGER, OF LA SALLE, ILLINOIS.

JAR-CLOSURE.

SPECIFICATION forming part of Letters Patent No. 640,332, dated January 2, 1900.

Application filed April 29, 1899. Serial No. 714,948. (No model.)

*To all whom it may concern:*

Be it known that we, JOSEPH L. DE STEIGER and EDWARD A. DE STEIGER, citizens of the United States, residing at La Salle, in the county of La Salle and State of Illinois, have invented new and useful Improvements in Jar-Closures, of which the following is a specification.

Our invention relates to fruit and other jars, and contemplates the provision of a jar-closure which is at once simple, durable, and highly efficient, and calculated to permit of a cover being quickly secured upon a jar-body and as quickly released and removed therefrom, and this with but a minimum amount of effort on the part of the operator.

With the foregoing in mind the invention will be fully understood from the following description and claims when taken in conjunction with the annexed drawings, in which—

Figure 1:
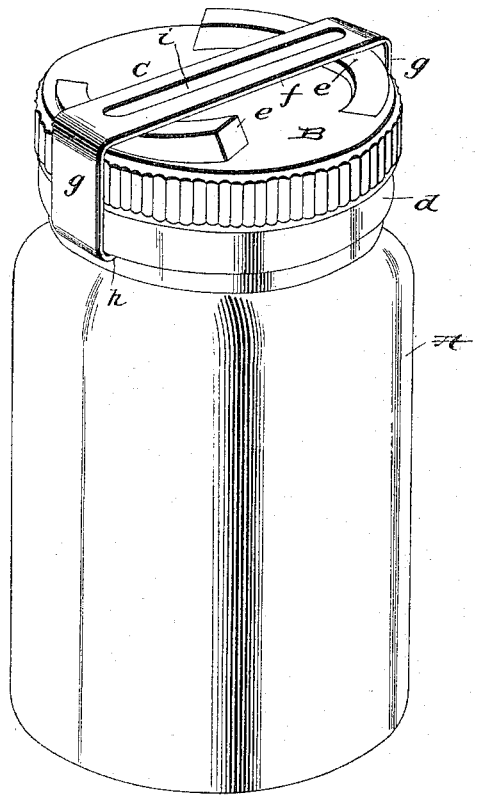
Figure 2:
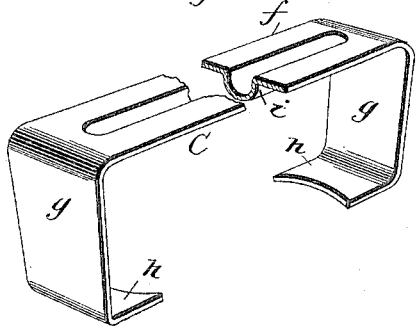

Figure 1 is a perspective view of a jar embracing our improvements with the cover and fastener in their operative positions. Fig. 2 is a perspective view of the fastener removed.

In the said drawings similar letters designate corresponding parts in both views, referring to which—

A is the body of our improved jar, the same being by preference of glass and provided adjacent to its upper end with an exterior annular shoulder $d$.

B is the cover, between which and the body A is designed to be interposed the usual gasket of rubber or other suitable material which we have not deemed it necessary to illustrate. The said cover preferably has its periphery corrugated or roughened to afford a handhold and is provided on its upper side adjacent to its periphery with two curvilinear oppositely-inclined ribs $e$, between the ends of which there are spaces of the proportional size illustrated for a purpose presently described.

C is the cover-fastener, which is formed of a single piece of sheet metal possessed of more or less resiliency. Said fastener comprises a horizontal body portion $f$, depending arms $g$, and angular branches $h$, which extend inwardly from the lower ends of the arms and have their ends dished, as shown, in order to conform to the curvature of the body A below the shoulder $d$. The arms $g$ are preferably inclined inwardly to a slight extent, as shown, in order that the space between the ends of branches $h$ may be normally of a less diameter than the body A below the shoulder $d$. As a result of this the ends of the fastener may be sprung into place on the jar-body and are enabled to exert pressure against said body, and thereby prevent casual movement or displacement of the fastener when the same is adjusted to secure the cover on the body.

The body $f$ of the fastener C is provided in its longitudinal center with a depending corrugation or rib $i$. This corrugation is formed by pressing or otherwise displacing the metal of said body and is of such length as to enable it to bear upon the inclined planes of the two ribs $e$. It serves incidentally to lend rigidity to the body $f$, but has for its main purpose to ease the movement of the body over the ribs $e$ and prevent the edges of said body from contacting with and chipping or otherwise marring the inclined planes of the said ribs $e$, which must be smooth in order to insure the easy manipulation of the fastener.

In the practice of our invention the gasket (not shown) and the cover B are first placed in position on the body A. The fastener is then placed over said cover between the ends of the ribs $e$ and pressed downwardly until its angular branches $h$ spring into position below the shoulder $d$. With this done the cover is grasped and turned, when the rib $i$ at the under side of the fastener-body will ride up the inclined ribs on the cover, and thereby force the cover down tight upon the gasket interposed between it and the body and seal the jar.

In order to open the jar, it is simply necessary to turn the fastener until it is loose and then remove it, together with the cover, from the jar-body.

When desired, the fastener may be turned in lieu of the cover, in which case the peripheral corrugations of the cover may be dispensed with.

Our invention may be used to advantage in bottles and the like as well as in jars, and we therefore desire to be understood as using the term "jar-body" in a sense sufficiently broad to comprehend a bottle-body or the like.

Having thus described our invention, what we claim is—

1. In a closure, the combination of a jar-body having an exterior annular shoulder, a cover having the two curvilinear and oppositely-disposed ribs on its upper side, and a fastener formed in one piece of sheet metal and comprising a horizontal body having a corrugation at its under side forming a rib arranged to bear on the ribs of the cover, and arms depending from the ends of the body and terminating in inwardly-directed branches arranged to engage the shoulder of the jar-body, substantially as specified.

2. In a closure, the combination of a jar-body having an exterior annular shoulder, a cover having the two curvilinear and oppositely-inclined ribs on its upper side, and a fastener formed in one piece of sheet metal and comprising a horizontal body having a longitudinal central corrugation at its under side forming a rib adapted to bear on the ribs of the cover, inwardly-inclined arms depending from the ends of the body, and angular branches extending inwardly from the lower ends of the arms and having their ends dished to conform to the curvature of the jar-body below the shoulder thereof, substantially as specified.

In testimony whereof we have hereunto set our hands in presence of two subscribing witnesses.

JOSEPH L. DE STEIGER.
EDWARD A. DE STEIGER.

Witnesses:
F. J. PURARD,
W. E. STAFFORD.